United States Patent [19]
Pembleton et al.

[11] 3,938,850
[45] Feb. 17, 1976

[54] BRAKE VALVE FOR A MOTOR VEHICLE BRAKE SYSTEM

[75] Inventors: James D. Pembleton, Lathrup Village; Keith C. Pratt, Ann Arbor, both of Mich.

[73] Assignee: Ford Motor Company, Dearborn, Mich.

[22] Filed: May 30, 1974

[21] Appl. No.: 474,509

[52] U.S. Cl. ............ 303/24 F; 188/349; 303/6 C; 303/22 R
[51] Int. Cl.² .......................................... B60T 8/14
[58] Field of Search.......... 303/24, 6 C, 6 R, 22, 87, 303/21 CG; 188/349; 251/251

[56] References Cited
UNITED STATES PATENTS

| | | | |
|---|---|---|---|
| 3,317,251 | 5/1967 | Hambling et al................ | 303/6 C X |
| 3,377,108 | 4/1968 | Eddy................................ | 303/6 C X |
| 3,377,109 | 4/1968 | Scott............................... | 303/6 R X |
| 3,383,139 | 5/1968 | Chevreux........................ | 303/6 C X |
| 3,403,946 | 10/1968 | Thirion............................ | 303/6 C X |
| 3,825,303 | 7/1974 | Yabuta............................ | 303/24 C X |
| 3,829,171 | 8/1974 | Rockwell........................ | 303/6 C X |

*Primary Examiner*—Trygve M. Blix
*Assistant Examiner*—Douglas C. Butler
*Attorney, Agent, or Firm*—Clifford L. Sadler; Keith L. Zerschling

[57] ABSTRACT

A brake valve for a motor vehicle brake system is interposed in the brake line between the master cylinder and the rear wheel brakes and is constructed to limit the increase in fluid pressure at the rear brakes relative to the increase in pressure at the front brakes during the application of master cylinder pressure. Pressure is limited at the rear brakes for the purpose of balancing the pressure between the front and rear brakes in accordance with the relative effectiveness of those brakes. The valve includes an inertia sensor that senses the rate of vehicle deceleration and modulates the pressure ratio between the front and rear brakes. The valve mechanism including its inertia sensor provides a device for compensating for the amount of load carried by the vehicle which, in turn, affects the relative effectiveness of the front and rear brakes.

1 Claim, 8 Drawing Figures

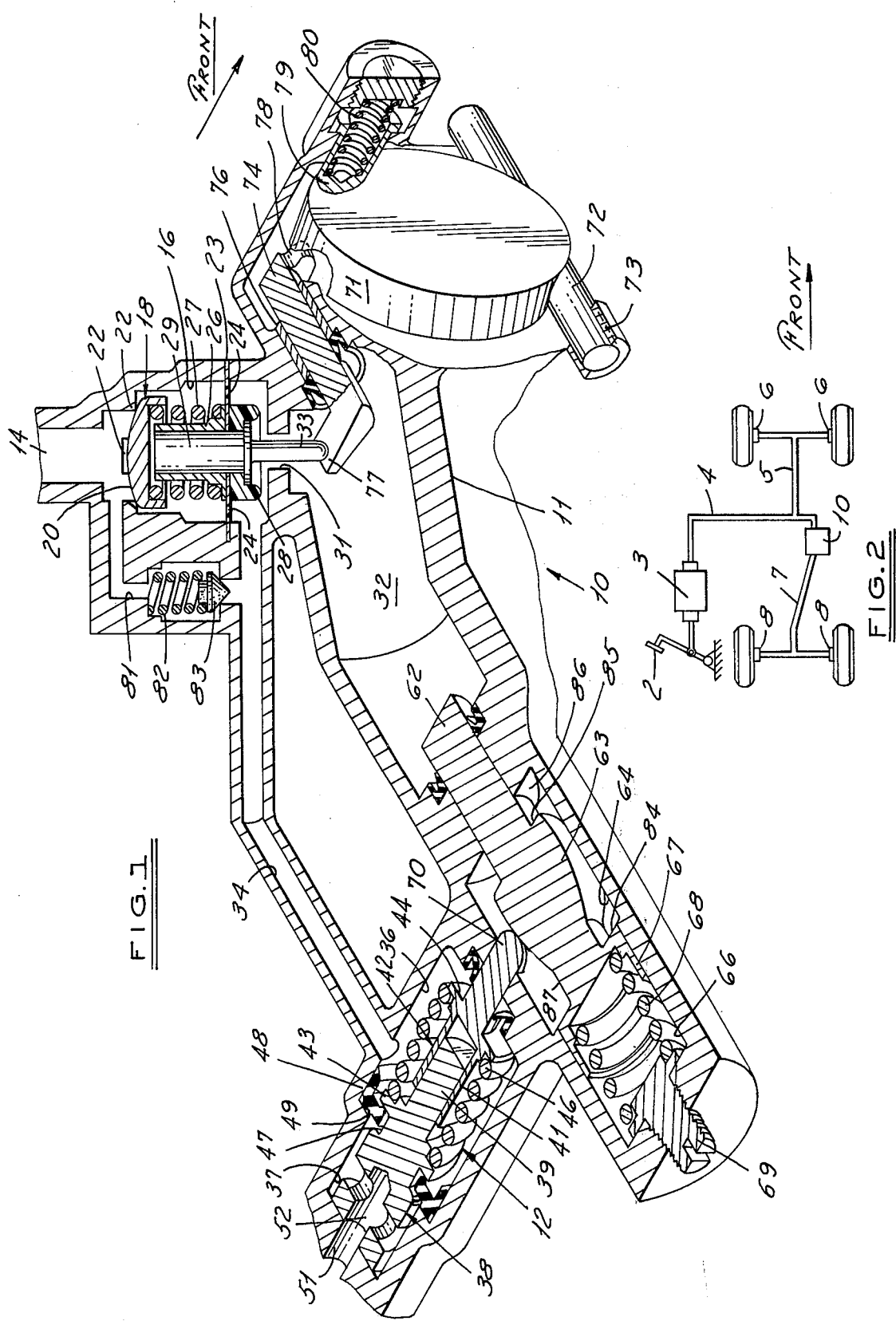

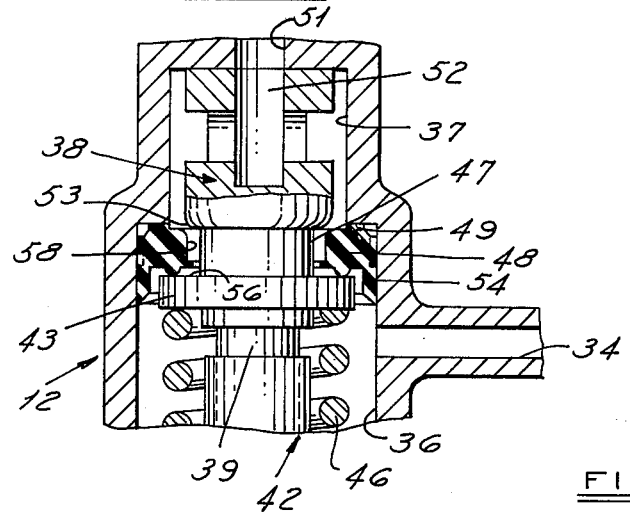
FIG. 3
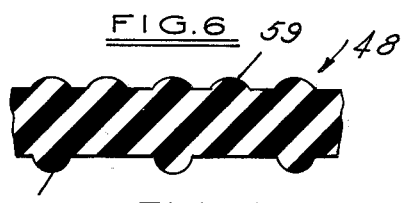
FIG. 6
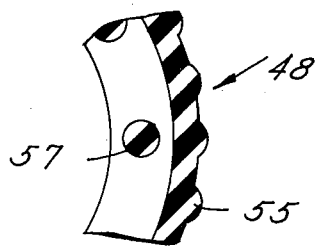
FIG. 7
FIG. 5
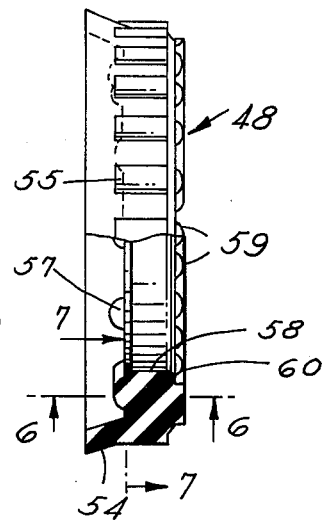
FIG. 4
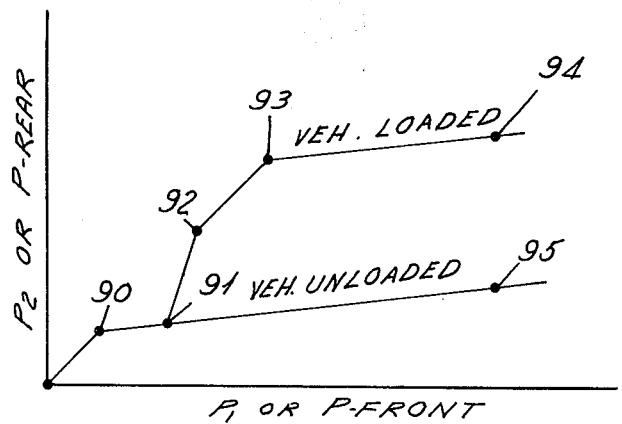
FIG. 8

BRAKE VALVE FOR A MOTOR VEHICLE BRAKE SYSTEM

BACKGROUND OF THE DISCLOSURE

It is known in the art to provide a pressure proportioning valve in a vehicle brake system that includes a master cylinder and front and rear wheel brakes. A typical proportioning valve limits the pressurization of the rear brakes relative to the front brakes in response to a master cylinder pressure that exceeds a predetermined minimum. During initial buildup of master cylinder pressure, the front and rear brakes are substantially equal. When the master cylinder pressure exceeds a predetermined minimum, the proportioning valve becomes effective to limit further increases in the pressure at the rear brakes whereby the front-to-rear pressures are at a ratio of less than one-to-one. U.S. Pat. No. 3,423,936 discloses such a proportioning valve.

A pressure proportioning valve interposed in a brake system functions to compensate for differences in the effectiveness of the front and rear brakes. The differences in effectiveness may be due, in part, to differences in the types of brakes employed (for an example, disc brakes on the front wheels and self-energizing drum brakes on the rear wheels) and also, for the dynamic weight shift to the front axle during a brake application. It is the weight shift which produces the principal need for a proportioning valve.

The imbalance between the effectiveness of the front and rear brakes is particularly apparent in a truck and varies substantially depending upon the amount of load which the truck carries. In a fully loaded truck, the weight on the rear axle may be such that the rear brakes having a braking capability that is almost as great as that of the front wheels. When the same truck is in an unladen condition, however, its rear brakes will not be nearly as effective as the front brakes. In such an unladen truck, equal pressure at the front and rear brakes would produce rear wheel skid when the master cylinder pressure is high enough to produce a moderate rate of vehicle deceleration.

The proportioning valve for a passenger automobile brake system is provided with a fixed split point, that is, a fixed point in the buildup of master cylinder pressure at which the proportioning valve becomes effective to limit or retard further increases in pressure at the rear brakes. Because the amount of load carried by a passenger automobile is not substantial in relationship to the total weight of the vehicle, the relative effectiveness of the front and rear brakes is not changed substantially by vehicle load changes. Therefore, a proportioning valve having a fixed split point is acceptable in passenger cars.

In a truck, however, where the relative effectiveness of the front and rear brakes changes greatly depending upon the load of the vehicle, it is desirable to have a proportioning valve with a split point that may be modulated in response to the load on the vehicle and the effectiveness of the brakes. In accordance with the present invention, a proportioning valve is provided having inertia sensitive means for modulating the split point of a brake proportioning valve in response to the rate of vehicle deceleration and master cylinder pressure.

In a vehicle brake system, two inherent conditions exist that are compensated for by the valve of the present invention. These conditions are known as "dead time" and "vehicle lag". Dead time refers to the delay that occurs between initial pressure buildup and brake application at the wheels. During dead time the brake shoes are moving from an at-rest position into contact with the brake drums. The second condition known as vehicle lag refers to the delay or lag that occurs between the instant brake pressure is established and the time when the vehicle begins to decelerate. This delay results from the dynamic character of the brake system and the vehicle. It is caused, in part, by elasticity in the brake system such as in the brake lines and in the suspension system which supports the vehicle wheels.

In the presently preferred embodiment of this invention, a brake valve is provided that includes (1) means for proportioning front to rear brake pressures, (2) inertia sensing means for modulating the proportioning function of the valve as a factor of vehicle loading, and (3) means for modifying the operation of the valve to compensate for dead time and vehicle lag.

BRIEF SUMMARY OF THE DISCLOSURE

In the embodiment of the invention disclosed in the drawings, a brake valve includes a spring pressed proportioning valve. The brake valve has an inlet that may be connected to a master cylinder and an outlet that may be connected to a rear wheel brake. The proportioning valve is constructed so that outlet pressures will be equal to the inlet pressure when the inlet pressure is less than a predetermined minimum pressure referred to as the split point. The split point of the proportioning valve is determined, in part, by the force exerted by a proportioning valve spring acting on a valve piston. When inlet pressures are above the split point the proportioning valve is operative to limit further increases in outlet pressure. With master cylinder pressures above the split point, the rate of increase in outlet pressure will be a fraction of the rate of increase in inlet pressure.

A modulating piston is disposed in a chamber normally in communication with inlet pressure. The piston has a cam surface that is coupled to the spring of the proportioning valve. In response to an increase in inlet pressure, the piston and cam surface will be displaced and the loading of the proportioning valve spring will be thereby increased. An increase in spring force will cause an increase in the pressure at which the split point occurs.

The contour of the cam is designed so that for any given master cylinder pressure between a predetermined minimum and maximum pressure, the split point will be above the master cylinder pressure and, hence, the proportioning valve will be inoperative insofar as its pressure limiting function is concerned.

The valve includes inertia sensing means for limiting the pressure buildup in the chamber having the modulating piston. An inertia weight that senses vehicle deceleration is arranged to close the inlet port to the chamber behind the modulating piston when the rate of deceleration reaches a predetermined amount such as 0.4 G's. When the specified rate of deceleration is realized, the chamber behind the modulating piston will be sealed so that any further increase in master cylinder pressure will not increase the pressure behind the the modulating piston. As a consequence, the modulating piston and associated cam surface will not be further displaced with respect to the proportioning valve spring. The proportioning valve will, therefore, have a stabilized split point. Subsequent increases in master cylinder pressure will exceed the stabilized split point and the proportioning valve will become operative to limit rear brake pressure.

In order to compensate for dead time in the brake system, the modulating cam has a cam surface with an initial flat or straight portion whereby initial displacement of the modulating piston and associated cam surface will not affect the force exerted by the spring in the proportioning valve. Therefore, displacement of the modulating piston will not affect the operation of the proportioning valve until after the pressure in the chamber increases by a preset amount over and above an initial split point pressure.

Means are provided in the valve for compensating for vehicle lag. The phenomena of vehicle lag is most noticeable during a spike stop, that is, a stop caused by an application of a high force at a rapid rate on the brake pedal. Compensating for vehicle lag is particularly desirable in an unladened vehicle in order to avoid rear wheel skid.

In a brake valve that is merely inertia sensitive, a spike stop might cause a pressure increase in the chamber behind the modulating piston that would produce a split point at an excessively high pressure not commensurate with the actual rate of vehicle deceleration due to vehicle lag. With such a condition, a rear wheel skid could be produced. In a proportioning valve in accordance with this invention, the initial buildup in inlet pressure does not affect the establishment of the initial split point of the proportioning valve because the modulating piston and modulating cam must be displaced by a minimum amount that exceeds the extent of the flat spot on the cam before the operation of the proportioning valve is affected. In addition, means are provided responsive to a surge in inlet pressure that closes the inlet to the chamber adjacent the modulating piston. Such action anticipates the buildup in rate of deceleration so that the modulating piston is not displaced by an amount that exceeds its programmed displacement for the actual rate of deceleration.

In summary, the present invention provides in its preferred embodiment a brake valve that incorporates a proportioning valve having a split point which may be modulated. The valve includes means for modulating the proportioning valve in response to a buildup of inlet pressure and the rate of vehicle deceleration. The valve includes (1) means for delaying the modulation of the proportioning valve until the buildup of inlet pressure exceeds a predetermined amount in order to compensate for dead time and (2) means for limiting the modulation of the proportioning valve in response to a surge in inlet pressure that precedes a buildup in vehicle deceleration in order to compensate for vehicle lag.

A brake valve in accordance with this invention portions the fluid pressure at the front and rear brakes in accordance with the relative effectiveness of those brakes as determined by the rate of vehicle deceleration which, in turn, is dependent upon master cylinder pressure buildup and vehicle loading.

BRIEF DESCRIPTION OF THE DRAWINGS

The many objects and advantages of a brake valve for a motor vehicle brake system that is constructed in accordance with this invention will become apparent upon consideration of the following detailed discussion and the accompanying drawings, in which:

FIG. 1 is a perspective view, in section, of an improved brake valve having a pressure proportioning valve;

FIG. 2 is a schematic view of a vehicle brake system incorporating the brake valve of FIG. 1;

FIG. 3 is an enlarged sectional view of a portion of the proportioning valve of FIG. 1;

FIG. 4 is an enlarged view, partly in section and partly in elevation, of one of the parts of the proportioning valve illustrated in FIG. 3;

FIG. 5 is an end view of a portion of the valve element illustrated in FIG. 4;

FIG. 6 is a sectional view of the valve element of FIG. 4 taken along section lines 6—6 thereof;

FIG. 7 is a sectional view of a portion of the valve element of FIG. 4 taken along section lines 7—7 thereof; and FIG. 8 is a graph comparing inlet pressure and outlet pressure of the brake valve of FIG. 1 under various conditions of pressure buildup and vehicle loading.

DETAILED DESCRIPTION OF A PREFERRED EMBODIMENT

Referring now to the drawings wherein the presently preferred form of this invention is illustrated, a motor vehicle brake system (see FIG. 2) includes an unique brake valve 10. A brake pedal 2 is linked to a brake master cylinder 3 which is connected by brake lines 4 and 5 to front wheel brakes 6. The brake valve 10 is interposed in the rear brake line 7 which is connected to the rear wheel brakes 8.

The brake valve 10 provides a means for regulating the pressure at the rear brakes 8. More particularly, the brake valve 10 includes a proportioning valve 12 and means for modulating the functioning of the proportioning valve in response to master cylinder pressure and rate of vehicle deceleration.

The brake valve assembly 10 has a housing 11 with an inlet port 14 that is connected by brake line 4 to the master cylinder 3 of the vehicle brake system. The inlet port 14 is joined with an inlet chamber 16 in which a surge responsive valve assembly 18 is situated. The internal wall of the housing 11 defining the inlet chamber 16 has a shoulder against which a button-shape member 20 is seated. The edge of the shoulder is cut away at circumferentially spaced locations to form bypass passages 22 around the edge of the button 20. A reed spring 23 is supported by the valve housing 11 and includes a plurality of ports 24 which combine with the passages 22 to permit communication between the upper end of the inlet chamber 16 and its lower end.

The reed spring 23 supports a tubular spring seat 26 that has an outwardly extending flange at its lower end. A coil spring 27 surrounds the tubular spring seat 26. The spring 27 is operatively interposed between the button or cap 20 and the flange of the spring seat 26. A valve element 28 is situated on the lower side of the reed spring 23. A pin 29 has a large diameter upper portion that extends through an aperture in the reed spring 23 and into the central bore of the tubular spring seat 26. A flange on the pin 29 engages the valve element 28. The lower end of the inlet chamber 16 is provided with a port 31 that leads to a pressure chamber 32. A reduced diameter portion 33 of the pin 29 extends through the port 31.

A valve passage 34 connects the lower end of the inlet chamber 16 with the proportioning valve 12. The structure of the surge sensing valve assembly 18 is such that free communication of master cylinder pressure fluid is provided from the inlet port 14, through the inlet chamber 16, through the passage 34 and to the proportioning valve assembly 12.

The construction of the proportioning valve 12 will now be described. The housing 11 of the valve 10 is constructed to provide a chamber 36 to which the passage 34 is connected. A reduced diameter outlet chamber 37 is situated at the end of the chamber 36. A valve piston 38 has portions disposed in both the chambers 36 and 37. The piston 38 has a shank portion 39 that is surrounded by the cylindrical portion 41 of a spring retainer 42. The piston 38 has a flange 43 that is spaced apart from a flange 44 formed on the spring retainer 42. A helical proportioning valve spring 46 is situated between the flanges 43 and 44. A groove 47 is formed on the piston 38 and an elastomeric valve element 48 is situated in the groove. The valve element 48 engages the wall of the chamber 36 and the shoulder 49 situated between the two chambers 36 and 37.

An outlet port 51 in chamber 37 is connected by brake line 7 to the rear brakes 8. A series of ports 52 in the end of the piston 37 assure communicaton for the flow of brake fluid from the chamber 37 to the outlet 51.

The elastomeric valve element 48 is engageable with the shoulder 49, the wall of the chamber 36 and the piston flange 43. A rounded shoulder or valve head 53 on the piston 38 functions either to permit the unrestricted transmission of fluid pressure from the chamber 36 to the outlet chamber 37 and the outlet port 51, or to close the fluid passage and modulate pressure at the outlet opening 51 with respect to the pressure in the passage 34. This is accomplished by the displacement of the piston 38 in response to the various fluid pressures acting on it.

The details of the construction of the elastomeric valve element 48 are shown in FIGS. 4 to 7. It will be seen that the valve element 48 has a depending lip 54, which in its free state is inclined angularly outwardly. When the valve element 48 is fitted in the chamber 56, lip 54 is deflected radially inwardly slightly by the engagement of its outer periphery with the wall of the chamber 36. This prevents the flow of fluid from the chamber 36 to the chamber 37 outwardly around the lip 54. The outer periphery of the valve element 48, adjacent the lip 54, is provided with a plurality of circumferentially spaced apart axially extending ribs 55 of generally semi-cylindrical shape. The ribs 55 contact the wall of the chamber 36.

The flange 43 of the piston 38 lies partly within the lip 54 and its shoulder 56 engages a plurality of spaced apart hemispherical bosses 57 projecting from the valve element 48. The outer diameter of the flange 43 is less than the inner diameter of the lip 54, thus permitting fluid to flow from the chamber 36, around the flange 43 and through the spaces between the bosses 57. The diameter of the groove 47 of the piston 38 is less than the diameter of the inner peripheral surface 58 of the valve element 48 adjacent thereto so that an open fluid path exists from the spaces between the bosses 57 to the outlet chamber 37 and the outlet 51 when the piston 38 is disposed in the position illustrated in FIG. 3.

One side of the valve element 48 is provided with a plurality of angularly spaced ribs 59 engageable with the housing shoulder 49 and in alignment with the ribs 55 to provide spaces therebetween for the return flow of fluid from the outlet chamber 36. By this means, fluid pressure at the outlet opening 51 can gain access to the outer periphery of the lip 54 so that if fluid pressure at the outlet 51 is higher than fluid pressure at the passage 34 after valve closure, the outlet pressure can force the lip 54 radially inwardly for the reverse flow of fluid from the outlet 51 to the chamber 36 around the valve element 48.

It will be seen that the valve element 48 has a rounded valve seat 60 disposed at the downstream end of its inner peripheral surface 58. The valve seat 60 of element 48 is engageable with the valve head or shoulder 53 of the piston 38 upon movement of the piston 38 in an upstream direction against the force exerted by the proportioning valve spring 46.

The proportioning valve 12 provides a path for the direct transmission of pressure from the passage 34 to the outlet port 51. This occurs around the periphery of the flange 43 of the piston 38, through the spaces between the bosses 57, through the annular gap between the seat 60 of valve element 48 and the valve head 53 of piston 38, and into the outlet chamber 37 which is in communication with the outlet port 51. This path remains open until the fluid pressure delivered to the chamber 36 attains a predetermined level known as the split point which is determined, in part, by the force exerted by the spring 46 on the piston 38.

The level of pressure at which the split point occurs is dependent upon the force of the spring 46 compared to the effective area of the piston 38 acted upon by fluid pressure in a direction opposing the force of the spring 46. This effective area is equal to the diameter of the cylindrical portion 39 of the piston 38, inasmuch as the end of the cylindrical portion 39 is sealed off from the inlet fluid pressure by the cylindrical portion 41 of the spring retainer 42 while fluid pressure acts against all of the remaining portions of the piston 38.

During the lower ranges of pressure in passage 34, the pressures in chambers 36 and 37 are equal because the fluid pressure acting on the effective area of the piston produces a force in an upstream direction that is insufficient to overcome the force of the spring 46. Assuming that $P_1$ equals the inlet fluid pressure in passage 34, A equals the cross sectional area of the cylindrical portion 39, and S equals the force of the spring 46, then the piston 38 will close (that is, valve head 53 will move into engagement with seat 60) when $P_1 A$ is greater than S.

When the valve head 53 closes against the valve member 48 in response to an increase in fluid pressure acting against the area A and the fluid pressure at the inlet passage 34 is further increased by the master cylinder 3, the increased level of fluid pressure will act against the piston 38 over an effective circular area having a diameter equal to the mean sealing diameter of the valve head 53 (hereafter called area B) less the area A. This produces a force on the piston 38 assisting the spring 46 and tending to reopen the piston 38 to deliver at least a portion of this increased fluid pressure to the outlet. It will be noted, however, that any of this increased fluid pressure delivered to the outlet 51 creates an opposing force on the piston 38 acting over the area B. This, of course, tends to reclose the piston 38 against the valve element 48.

These opposing forces tend to keep the valve head 53 closely adjacent to the valve seat 60 for the restricted flow of fluid from the inlet passage 34 to the outlet port 51 to create a pressure at the outlet 51 which increases at a lower rate than the rate of increase in pressure in the passage 34. The ratio of the pressures is determined by the relationship of the effective areas previously referred to. After the valve first closes, the increase in pressure at the inlet passage 34 (hereafter called $\Delta P_1$) will produce an increase in pressure at the outlet opening 51 (hereafter called $\Delta P_2$) in accordance with the following formula:

$$\Delta P_1 \left( \frac{B-A}{B} \right) = \Delta P_2$$

Similarly, if we assume $P_2$ is the pressure at the outlet port 51, then $P_2B = P_1(B-A) + S$ after the valve piston 38 becomes operative. Accordingly, the fluid pressure existing at the front brakes 6 will be greater than the fluid pressure in the rear brakes 8 when the brakes are applied with a pressure greater than necessary to move the piston 38 against the force of the spring 46.

During that portion of a brake application in which the applied petal effort is reduced subsequent to a brake application of sufficient intensity to have moved the piston 38 to the restricted flow position, $P_1$ acting on the area $$B - \frac{A}{B}$$

is reduced. Thus, the forces tending to move the valve piston 38 toward the outlet 51 are reduced and the piston 38 moves downwardly (as seen in FIG. 3) under the influence of the pressure of the outlet chamber 37 acting on the area B. As the piston 38 moves in a direction away from the port 51, the available volume for the fluid at the rear brake cylinders is increased, thereby accomplishing a reduction in the pressure $P_2$. The piston 38 will continue its movement away from the port 51 in an effort to reduce the pressure $P_2$ to satisfy the previously mentioned formula:
$P_2B = P_1(B-A) + S$.

However, the valve piston 38 will not completely achieve this result because of the limited possible travel thereof. During the reduction in pressure in the passage 34 the pressure at the outlet port 51 can never be greater than the pressure in the passage 34. This is because the fluid at the outlet 51 is able to flow around the valve element 48 and between the lip 54 and the wall of the chamber 36 if the fluid pressure in the chamber 36 is at a lower level. The valve element 48 accordingly functions as a check valve to prevent rear brake pressure (the pressure at port 51) from ever being greater than front wheel or master cylinder pressure.

When the pressure in the passage 34 is reduced beneath the level at which the proportioning valve 12 originally closed, the valve piston 38 will be moved toward the port 51 by the spring 46 to reopen the annular passage between the valve head 53 and the valve member seat 60.

In summary, the proportioning valve 12 provides direct communication between the passage 34 and the outlet port 51 until such time as the pressure buildup reaches a predetermined value known as the split point. When the inlet pressure exceeds the predetermined split point, the proportioning valve operates to limit the pressure at the outlet port 51. More particularly, the proportioning valve 12 operates to limit the rate of pressure buildup at port 51 as the pressure increases in the passage 34 above the split point.

The split point for the valve 12 is a function in part of the force exerted by the spring 46 on the piston 38. Means are provided in accordance with the present invention for loading the spring 46 and changing the split point of the proportioning valve 12. In accordance with the invention, the proportioning valve 12 is modulated by an inertia sensitive means that compensates for vehicle loading.

A modulating piston 62 is slidably supported in the housing 11 of the valve 10 and has an area exposed to the pressure in fluid chamber 32. A modulating cam 63 is connected to the piston 62. The cam 63 is situated in a chamber 64 that is adjacent a smaller diameter chamber 66. A spring seat 67 formed on the end of the modulating cam 63 is slidably supported in the bore of chamber 66. It will be noted from the drawing that the modulating piston 62, the modulating cam 63 and the spring seat 67 are rigidly interconnected.

A coil spring 68 engages the spring seat 67 and an adjustable spring seat 69 that is threadedly supported in the housing 11 at the end of the chamber 66. The coil 68 exerts a spring force urging the cam 63 to the right (as seen in FIG. 1) and the piston 62 into the chamber 32. Under the force of the spring 68, the shoulder 85 intermediate the piston 62 and the cam 63 is seated against the abutment 86 of the housing 11 when the chamber 32 is not pressurized.

The spring retainer 42 for the coil spring 46 of the proportioning valve 12 has a rod-like extension 70 that protrudes from the chamber 36 of the proportioning valve 12 into the chamber 64 of the modulating cam 63. The end of the pin 70 has a rounded surface that functions as a cam follower and is in slidable engagement with the cam surface of the modulating cam 63. It will be readily apparent that the position of the cam 63 will determine the position of the spring retainer 42 and, hence, the force of the spring 46 (force S) on the valve piston 38.

The modulating piston 62 and cam 63 are displaced in accordance with the pressure in chamber 32. Chamber 32 is normally in communication with the pressure in inlet chamber 16 and inlet port 14. Means are provided in accordance with the present invention for closing the port 31 and sealing the chamber 32 from the inlet port 14. The valve member 28 of the surge sensing valve 18 is arranged to close the port 31 in response to the displacement of an inertia weight 71 from its normal position.

The inertia weight 71 has a pivot shaft 72 at its lower end. The shaft 72 is rotatably supported by bearings 73 provided in the housing 11 of the valve 10 with the axis of the shaft 72 arranged transversely of the vehicle of FIG. 2. A bell crank 74 is pivotally supported by a bushing 76 in the housing 11 and has a first lever arm 77 that engages the end of the extending portion 33 of the pin 29. A second lever arm portion 78 of the bell crank 74 contacts the back side of the inertia weight 71.

A plunger 79 is slidably supported in a bore in the housing 11 of the valve 10 and is pressed by a spring 80 into engagement with the inertia weight 71. The spring 80 and plunger 79 urge the inertia weight 71 in a counterclockwise direction (as seen in FIG. 1) about the axis of the pivot pin 72 into engagement with the portion 78 of the bell crank 74.

The spring 80 exerts a force on the inertia weight 71 that is transmitted through the bell crank 74 to the pin 29. This spring force holds the valve element 28 in a spaced relationship with respect to the port 31. If the weight 71 is moved by an inertia force against the spring 80, the spring 27 will cause the valve element to move to a position sealing the port 31.

A passage 81 is situated at the inlet of the valve 10 and connects the inlet port 14 with the passage 34. A spring pressed check valve 82 is interposed in the passage 81. The valve element 82 of the check valve is slightly biased so as to provide a substantially unrestricted path for the return flow of fluid from the passage 34 to the inlet port 14 which bypasses the inlet chamber 16 and the surge sensing device 18.

OPERATION

As previously explained, the brake valve 10 is interposed in the brake line between the master cylinder 3 and the rear brakes 8 of a motor vehicle brake system. It functions to limit the fluid pressure at the rear brakes 8 relative to the fluid pressure at the front brakes 6 when the master cylinder pressure exceeds a predetermined minimum amount. The valve 10 modulates that predetermined minimum amount in accordance with the rate of vehicle deceleration. In addition, means are provided for modulating the modulating means in order to compensate for dead time and vehicle lag.

During a brake application, the master cylinder 3 delivers fluid pressure to the front wheel brakes 6 and through the brake valve 10 to the rear brakes 8. During initial pressure buildup, the pressures at the front and rear brakes are substantially equal. At a predetermined master cylinder or inlet pressure (the split point), the proportioning valve 12 becomes operative to limit further increases in output pressure at the output 51.

The split point for the proportioning valve 12 is determined, in part, by the force of the spring 46. The pressure responsive modulating piston 62 and modulating cam 63 provide a means for displacing the spring retainer 42 and increasing the force exerted by the spring 46 on the piston 38 in response to the pressure in the chamber 32. During an initial phase of a brake application, the pressure in chamber 32 will be equal to inlet pressure 14.

FIG. 1 discloses the modulating piston 62 and modulating cam 63 displaced in a left-hand direction in response to a pressure buildup in chamber 32. Prior to the transmittal of fluid pressure to the valve 10 by the master cylinder 3, the modulating piston 62 and modulating cam 63 will be spring pressed to a right-hand position (as seen in FIG. 1) with the shoulder 85 seated against the abutment surface 86 of the housing 11 and portion 84 of the spring seat 67 adjacent the end of the cam follower 70. Assuming a brake application with a progressively increasing pressure at the inlet 14, an equivalent increase in pressure will occur in the modulating pressure chamber 32 and in the pressure passage 34 leading to the proportioning valve 12. As the pressure increases, the fluid pressure at the outlet 51 will equal the pressure in the passage 34. The piston 62 will remain stationary with the shoulder portion 85 seated against the abutment 86 under the force of the spring 68.

When the fluid pressure in the passage 34 reaches a predetermined amount, the proportioning valve 12 will become operative to limit further increases in pressure at the outlet 51. At the same time, modulating piston 62 and modulating cam 63 will begin to be displaced to the left against the spring 68. The initial portion 87 of the cam surface contacts the cam follower 70 along a straight line parallel to the axis of the cam 63 and piston 62. Therefore, initial displacement of the modulating cam 63 will not cause displacement of the spring retainer 42 or a change in the loading of the proportioning valve spring 46.

As the pressure builds up and the cam follower 70 passes the straight area 87 and engages the curved portion of the cam 73, the cam surface is contoured to force the spring retainer 42 inwardly to increase the loading on the proportioning valve piston 38. This will cause the proportioning valve 12 to cease its pressure limiting function by raising the split point above the pressure in passage 34. Thereafter, the pressure at the outlet port 51 will increase from a reduced pressure to a value equal to the pressure in the passage 34. After the modulating cam 63 has been displaced by the pressure in chamber 32 to its full extent (when spring 68 is fully collapsed), a further increase in pressure in the passage 34 will cause the proportioning valve 12 to again function as a pressure limiting device and subsequent increases in pressure in the passage 34 will be accompanied by lesser increases in pressure at the outlet 51. When the cam 63 has been fully displaced, a maximum split point for the proportioning valve 12 will have been achieved and further increases in master cylinder pressure (the pressure in passage 34) will exceed that split point.

Referring to the graph of FIG. 8, the pressure at the valve inlet 14 ($P_1$) is plotted against the pressure at the valve outlet 51 ($P_2$). This is equivalent to a plot of the relative pressures at the front and rear brakes. The graph begins at an initial point where all pressures are equal to zero. As the master cylinder pressure slowly increases, the front and rear pressures are increased in equal amounts until the master cylinder pressure reaches the initial split point which is indicated by reference numeral 90 on the graph. Subsequent increases in pressure at the inlet port 14 are accompanied by substantially lesser increases in pressure at the outlet port 51 as the proportioning valve 12 becomes operative. As the inlet pressure increases, the cam 63 will be displaced so that the cam follower 71 will engage the curve portion of the cam and thereby cause the spring retainer 42 to be displaced and increase the loading on the coil spring 46. The cam surface is contoured to increase the loading of spring 46 to an extent whereby the split point is raised above the pressure in passage 34.

With the pressure in passage 34 below the new higher split point, the proportioning valve 12 will temporarily cease to function as a pressure limiting device. Thereafter, the pressure at outlet 51 will increase rapidly until it again becomes equivalent to the pressure in the passage 34. This operation is illustrated in the graph. The portion of the graph between points 90 and 91 shows the pressure limiting operation of the proportioning valve 12. At point 91, the modulating cam 63 has been displaced to an extent whereby the spring 46 is loaded so as to deactivate the proportioning valve 12. The portion of the curve between points 91 and 92 shows the pressure at the outlet 51 increasing to a point where it becomes equal to the pressure in the passage 34. From point 92 to point 93, the inlet and outlet or front and rear brake pressures are substantially equal.

At point 93, the cam 63 reaches the limit of its travel and the limit of its ability to disable the proportioning valve 12. Therefore, point 93 represents the maximum split point for the proportioning valve 12. Subsequent increases in pressure in the passage 34 are limited at the outlet 51 by the proportioning valve. During further increases in pressure above the point 93, the proportioning valve 12 resumes its function of limiting the increases in pressure at the outlet 51 and at the rear brakes.

The curve containing the points 90, 91, 92, 93 and 94 represents the ratio of front to rear pressure for a vehicle having a full load. In a vehicle that is unladen, a given pressure at the master cylinder 3 will cause the vehicle to decelerate at a greater rate than if it were fully loaded. In order to compensate for the fact that the rear brakes of an unladen vehicle are less effective, means are provided for limiting the operation of the modulating cam whose normal function it is to disable the proportioning valve.

In an unladen vehicle having the brake valve 10, a buildup in master cylinder pressure will produce a front to rear or $P_2$ to $P_1$ curve that passes through the points 90 and 91. If the vehicle is unladen, the inertia weight 71 will sense a higher rate of deceleration and will pivot against the plunger 79 and spring 80. With the weight 71 displaced, the valve element 28 will be pushed downwardly by the coil spring 27 whereby the inlet port 31 to chamber 32 will be sealed.

With the port 31 sealed, there will be no further pressure increase in the chamber 32 and the position of the piston 62 and modulating cam 63 will be stabilized. Therefore, further increases in pressure in the passage 34 will be met by a proportioning valve 12 that is operative to limit any increase in pressure at the outlet 51. This is represented in the graph of FIG. 8 by the line passing through points 90, 91 and 95. In effect, the cam 63 will be prevented from increasing the split point of the proportioning valve 12 above the pressure in the passage 34 by the displacement of inertia weight 71 and the valve element 28 coupled thereto.

During a very rapid increase in brake line pressure as might occur during a spike stop, a pressure buildup in the chamber 32 could displace the piston 62 and modulating cam 63 in a left-hand direction whereby the proportioning valve 12 would be disabled except for high master cylinder pressures. In the event this should happen in an unladen vehicle, skidding of the rear brakes would occur. A lag occurs between a rapid buildup in brake line pressures and deceleration of the vehicle in a spike stop situation. Under this circumstance, the pressure would buildup in the chamber 32 to displace the piston 62 and cam 63 before the inertia weight 71 would sense any vehicle deceleration. In order to compensate for this vehicle lag condition, the surge device 18 is provided. Under conditions of a very rapid increase in brake line pressure, the button 20 will be displaced downwardly and this displacement will cause the valve element 28 to move to a position sealing the port 31. The pin 29 and its extension 33 will cause the crank 72 to be angularly displaced which, in turn, will move the inertia weight 71. Thus, a surge in brake line pressure will be sensed by the surge device 18 whereby the chamber 32 will be sealed and the piston 62 and cam 63 will be prevented from further displacement. Therefore, the modulating cam 73 will not be displaced by a sudden increase in master cylinder pressure and the proportioning valve 12 will be operative to limit the increase in pressure at the outlet 51 and at the rear brakes 8.

As a result of test work, it has been found desirable to select an inertia weight 71 and spring 80 combination such that the weight will be displaced when it senses a rate of vehicle deceleration equal to 0.4 G's. With such a construction, when the vehicle is braked and reaches a rate of deceleration of 0.4 G's, the chamber 32 will be sealed and further displacement of the modulating cam 63 will be prevented whereby any increase in master cylinder pressure and the pressure in passage 34 will cause the proportioning valve 12 to become operative to limit the outlet pressure. The surge device 18 provides a means for sealing the chamber 32 prior to the achievement of an 0.4 G rate of deceleration. Due to the phenomena of vehicle lag, the surge device 18 provides a means that anticipates a high rate of deceleration that will follow jamming the brake pedal 2 by the vehicle operator.

The graph of FIG. 8 plots the inlet and outlet pressures or front to rear pressures for an unladen vehicle along the points 90, 91, 95 and for a fully loaded vehicle along the points 90, 91, 92, 93 and 95. A vehicle having only a partial load would exhibit a curve intermediate the two lines through points 91, 95 and through points 93, 94. For the unladen vehicle, the proportioning valve 12 has a single split point indicated by point 90 on the curve. For a fully loaded vehicle, the proportioning valve 12 has an initial split point indicated by point 90. The proportioning valve 12 becomes deactivated at point 91 due to the displacement of the cam 63 and it has a second split point indicated by graph point 93.

For a partially loaded vehicle, the proportioning valve 12 would have an initial split point, would become deactivated at graph point 91 due to the displacement of the cam 63 and then would have a second split point that would lie somewhere along the curve passing through points 91, 92 and 93. After the second split point, the curve for the partially loaded vehicle would be parallel to the lines through points 91, 95 and points 93, 94.

A spike stop in an unloaded vehicle would follow the curve 90, 91, 95 due to the operation of the surge valve 18 which seals chamber 32. The surge valve prevents a rapid buildup of pressure in the chamber 32 which would cause the valve to portion the pressure along the curve 90, 91, 92, 93 before the inertia weight 71 would sense a 0.4 G rate of deceleration.

In summary, the present invention provides a brake valve for installation in a rear brake line to portion the fluid pressure at the rear brakes relative to the pressure at the front brakes. The valve includes a proportioning valve which limits the rear brake pressure after the master cylinder pressure reaches a split point. The valve includes disabling or modulating means that deactivates the proportioning valve by increasing its split point above the inlet pressure in response to a buildup in such pressure. An inertia sensitive device is arranged to deactivate the disabling or modulating means whereby the split point of the proportioning valve will be stabilized. The disabling or modulating means also include means for delaying its operation to compensate for dead time in the brake system. Means are further provided for compensating for vehicle lag by deactivating the disabling means.

The brake valve 10 is adaptable to a brake system having a manually actuated master cylinder as seen in FIG. 2. It is intended that the term "master cylinder" be considered as any source of brake fluid pressure, whether such pressure is generated manually or by a power source.

The foregoing description presents the presently preferred embodiment of this invention. Modifications and alterations may occur to those skilled in the art that will come within the scope and spirit of the following claims.

I claim:
1. A brake valve for a motor vehicle brake system,
said brake valve having a pressure inlet constructed to be connected to a brake master cylinder and a pressure outlet constructed to be connected to a wheel brake,
said brake valve having a proportioning valve constructed to limit a pressure increase at said outlet relative to a pressure increase at said inlet when the pressure at said inlet exceeds a pressure determined, in part, by the force exerted by a proportioning valve spring,
a fluid chamber and communicating means connecting said chamber to said inlet,
a piston disposed, in part, in said chamber,
a second spring biasing said piston to an at-rest position,
said piston being coupled to a cam means,
said cam means being coupled to said proportioning valve spring and constructed to increase said force exerted by said proportioning valve spring in response to displacement of said piston,
said piston being displaceable in response to fluid pressure in said chamber that exceeds a predetermined minimum pressure that is determined, in part, by the biasing force of said second spring on said piston whereby said cam means increases said force exerted by said proportioning valve spring in response to the fluid pressure in said chamber,
said cam means having a cam surface with a straight line portion whereby initial displacement of said cam means will not produce an increase in said force exerted by said proportioning valve spring,
inertia sensitive valve means disposed, in part, in said communication means and constructed to close the communication between said chamber and said inlet in response to a rate of vehicle deceleration that exceeds a predetermined minimum rate,
pressure limiting means disposed in said communication means and constructed to limit the communication between said inlet and said chamber in response to a rate of increase in pressure in said inlet that exceeds a predetermined minimum rate thereby providing means to compensate for vehicle lag.

* * * * *